(12) United States Patent
Atarashi et al.

(10) Patent No.: US 7,898,200 B2
(45) Date of Patent: Mar. 1, 2011

(54) CONTROLLER OF ELECTRIC MOTOR

(75) Inventors: Hirofumi Atarashi, Wako (JP); Shoei Abe, Wako (JP); Keiichi Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 12/062,207

(22) Filed: Apr. 3, 2008

(65) Prior Publication Data
US 2008/0246363 A1 Oct. 9, 2008

(30) Foreign Application Priority Data
Apr. 4, 2007 (JP) ............................. 2007-098484

(51) Int. Cl.
H02P 7/00 (2006.01)
(52) U.S. Cl. ...................... 318/432; 318/434; 318/440; 318/478; 322/16; 310/156.36; 310/156.01; 310/156.02; 310/113
(58) Field of Classification Search ................ 318/432, 318/434, 440; 322/16; 310/254, 156.01, 310/156.32, 156.35, 156.36, 113
See application file for complete search history.

(56) References Cited

U.S. PATENT DOCUMENTS

| | | | | | |
|---|---|---|---|---|---|
| 4,963,813 | A | * | 10/1990 | Bolle | 320/116 |
| 5,083,077 | A | * | 1/1992 | Wallace et al. | 322/32 |
| 5,151,641 | A | * | 9/1992 | Shamoto | 318/762 |
| 5,355,071 | A | * | 10/1994 | Ishida et al. | 320/110 |
| 5,418,437 | A | * | 5/1995 | Couture et al. | 318/139 |
| 5,652,493 | A | * | 7/1997 | Hendershot, Jr. | 318/701 |
| 5,789,877 | A | * | 8/1998 | Yamada et al. | 318/9 |
| 5,883,496 | A | * | 3/1999 | Esaki et al. | 320/132 |
| 5,909,094 | A | * | 6/1999 | Yamada et al. | 318/140 |
| 5,942,862 | A | * | 8/1999 | Yamada et al. | 318/9 |
| 6,271,462 | B1 | * | 8/2001 | Tsuzuki et al. | 136/243 |
| 6,794,776 | B1 | * | 9/2004 | Gabrys | 310/74 |
| 7,034,427 | B2 | * | 4/2006 | Hirzel | 310/191 |
| 7,564,156 | B2 | * | 7/2009 | Okumoto et al. | 310/114 |
| 2003/0193263 | A1 | * | 10/2003 | Maslov et al. | 310/254 |

(Continued)

FOREIGN PATENT DOCUMENTS

JP 01-157256 A 6/1989

(Continued)

*Primary Examiner*—Rita Leykin
(74) *Attorney, Agent, or Firm*—Arent Fox LLP

(57) ABSTRACT

A controller able to efficiently operate an electric motor of an axial air-gap type as an electric motor and an electricity generator is provided.

The controller of the electric motor (3) of the axial air-gap type has a rotor (11) having a permanent magnet, and a first stator (12a) and a second stator (12b) oppositely arranged through the rotor (11) in a rotation axis direction of the rotor (11); wherein the controller includes a first electric current command determining section (30) for supplying a driving electric current from a first power source (38a) to an armature winding (13a) of the first stator (12a), and rotating the rotor (11); a first electric current control section (40a); a second electric current command determining section (37) for charging a second power source (39) by electric power generated in an armature winding (13b) of the second stator (12b) when the rotor (11) is rotated by the supply of the driving electric current to the armature winding (13a) of the first stator (12a); and a second electric current control section (40b).

11 Claims, 6 Drawing Sheets

U.S. PATENT DOCUMENTS

2005/0029890 A1 * 2/2005 Kadoya et al. ............... 310/180
2006/0125433 A1    6/2006 Kamen et al.

FOREIGN PATENT DOCUMENTS

| JP | 07-075212 A   | 3/1995  |
| JP | 07 115704 A   | 5/1995  |
| JP | 08 331705 A   | 12/1996 |
| JP | 10-271784 A   | 10/1998 |
| JP | 2001-136721 A | 5/2001  |
| JP | 2002-052592 A | 2/2002  |
| JP | 2002-369467 A | 12/2002 |
| JP | 2004-215483 A | 7/2004  |

* cited by examiner

CONTROLLER OF ELECTRIC MOTOR

FIELD OF THE INVENTION

The present invention relates to a controller of an electric motor of an axial air-gap type.

BACKGROUND ART

The electric motor of the axial air-gap type having a rotor having a permanent magnet, two stators arranged on both sides of the rotor in a rotation axis direction of the rotor, and an armature winding mounted to each stator is formerly known (e.g., see Japanese Patent Laid-Open No. 10-271784 and Japanese Patent Laid-Open No. 2001-136721). In accordance with such an electric motor of the axial air-gap type, relatively high output torque can be generated while the axial length of the rotor of the electric motor is shortened.

In electric conducting control of the electric motor of the axial air-gap type, an electric current is conducted to the armature windings of both the stators arranged on both the sides of the rotor in the technique described in the above publications. Thus, leakage of a magnetic flux in the armature of the stator is reduced and output torque of the electric motor can be increased.

Now, an idea that the electric motor of the axial air-gap type is also operated as an electricity generator to perform a driving operation and an electricity generating operation may come up. However, in the cited documents 1 and 2, there is no description about a construction where the electric motor of the axial air-gap type is also operated as the electricity generator. Therefore, an object of the present invention is to provide a controller able to efficiently operate the electric motor of the axial air-gap type as the electric motor and the electricity generator.

SUMMARY OF THE INVENTION

The present invention is made to achieve the above object, and relates to a controller of an electric motor of an axial air-gap type comprising a rotor having a permanent magnet, and a first stator and a second stator oppositely arranged through the rotor in a rotation axis direction of the rotor.

The controller comprises a first current conducting control means for supplying a driving electric current from a first power source to an armature winding of the first stator in order to rotate the rotor; and a second current conducting control means for charging a second power source by electric power generated in an armature winding of the second stator when the rotor is rotated by the supply of the driving electric current to the armature winding of the first stator.

In accordance with such a present invention, while the electric motor is rotated by the armature winding of the first stator and the rotor, the electric motor can be operated as an electricity generator by combining the armature winding of the second stator and the rotor. In this case, a compact package can be set by integrating the electric motor and the electricity generator in comparison with a case in which the electric motor and the electricity generator are set to different bodies. Further, when request torque with respect to the electric motor is small and there is a margin in the output of the electric motor, the second power source can be efficiently charged by electric power generated in the second stator by the second current conducting control means.

Further, characteristics of the armature winding of the first stator and the armature winding of the second stator are set such that an induced voltage caused in the armature winding of the second stator by rotating the rotor becomes lower than a predetermined voltage when the predetermined voltage is applied to the armature winding of the first stator by the first current conducting control means and the driving electric current is supplied thereto.

In accordance with such a present invention, the induced voltage caused in the armature winding of the second stator becomes lower than the voltage applied to the armature winding of the first stator. Therefore, a charging circuit of the second power source connected to the armature winding of the second stator can be set to a low withstand voltage specification. Thus, the charging circuit can be made compact.

Further, the second current conducting control means switches between an electricity generating mode for charging the second power source by electric power generated in the armature winding of the second stator, and a driving mode for supplying the driving electric current from the second power source to the armature winding of the second stator in accordance with request torque of the electric motor.

In accordance with such a present invention, when the request torque of the electric motor is high, the second current conducting control means supplies the driving electric current from the second power source to the armature winding of the second stator. Thus, a magnetic flux generated by the driving electric current supplied to the armature winding of the first stator is swept by the driving electric current supplied to the armature winding of the second stator, and the output torque of the electric motor can be raised. On the other hand, when the request torque of the electric motor is low, the second current conducting control means charges the second power source by electric power generated in the armature winding of the second stator. Thus, when the request torque of the electric motor is small, a charging amount of the second power source can be secured.

Further, the controller comprises a charging state detecting means for detecting a charging state of the second power source, and the second current conducting control means switches between the electricity generating mode and the driving mode, in accordance with the request torque of the electric motor and the charging state of the second power source.

In accordance with such a present invention, the electricity generating mode and the driving mode can be switched by the second current conducting control means in consideration of a balance of the request torque of the electric motor and the charging state of the second power source.

Further, the controller comprises a charging state detecting means for detecting a charging state of the second power source; and a change-over switch for switching connection between the armature winding of the second stator and a driving circuit of the armature winding of the second stator to a conducting state and an interrupting state; and the second current conducting control means switches between an electricity generating mode for charging the second power source by electric power generated in the armature winding of the second stator, a driving mode for supplying the driving electric current from the second power source to the armature winding of the second stator, and an interruption mode for setting a portion between the armature winding of the second stator and a driving circuit of the armature winding of the second stator to the interrupting state by the change-over switch, in accordance with request torque of the electric motor and the charging state of the second power source.

In accordance with such a present invention, when it is a state other than the electricity generating mode and the driving mode, the portion between the armature winding of the second stator and the driving circuit of the armature winding of the second stator is interrupted as the interruption mode.

Thus, it is avoided that the induced voltage is caused in the armature winding of the second stator, and rotation load of the rotor can be reduced.

Further, the controller comprises a charging state detecting means for detecting a charging state of the second power source; and in accordance with request torque of the electric motor and the charging state of the second power source, the second current conducting control means switches between an electricity generating mode for charging the second power source by electric power generated in the armature winding of the second stator, a driving mode for supplying the driving electric current from the second power source to the armature winding of the second stator, and an interruption mode in which both a first switching element for switching conduction and interruption on a high electric potential side of an input section of the armature winding of each phase, and a second switching element for switching conduction and interruption on a low electric potential side of the input section of the armature winding of each phase are set to an off state, wherein the first switching element and the second switching element constitute a driving circuit of the second stator and are arranged for each phase of the second stator.

In accordance with such a present invention, when it is a state except for the electricity generating mode and the driving mode, both the first switching element and the second switching element are set to the off state as the interruption mode so that the electric current generated in the armature winding of the second rotor by the rotation of the rotor is reduced, and rotation load of the rotor can be reduced.

Further, the controller comprises a rotational speed detecting means for detecting a rotational speed of the electric motor; and in the interruption mode, the second current conducting control means sets each first switching element and each second switching element to the off state when the rotational speed of the electric motor is less than a predetermined rotational speed, and sets each first switching element to an on state and sets each second switching element to the off state, or sets each first switching element to the off state and sets each second switching element to the on state, when the rotational speed of the electric motor is the predetermined rotational speed or more.

In accordance with such a present invention, when the rotational speed of the electric motor is high, each first switching element is set to the on state and each second switching element is set to the off state, or each first switching element is set to the off state and each second switching element is set to the on state. Thus, the electric current generated in the armature winding of the second rotor by the rotation of the rotor is further reduced, and rotation load of the rotor can be reduced.

Further, magnetic circuit cross sections of the first stator and the second stator are set to the same.

In accordance with such a present invention, matching property of magnetic resistance in the armature of the first stator and magnetic resistance in the armature of the second stator is raised in the driving mode, and magnetic fluxes generated by the armature winding of the first stator and the armature winding of the second stator can be further strengthened.

DESCRIPTION OF THE PREFERRED EMBODIMENTS

One embodiment of the present invention will be explained with reference to FIGS. 1 to 6.

Figure 1:
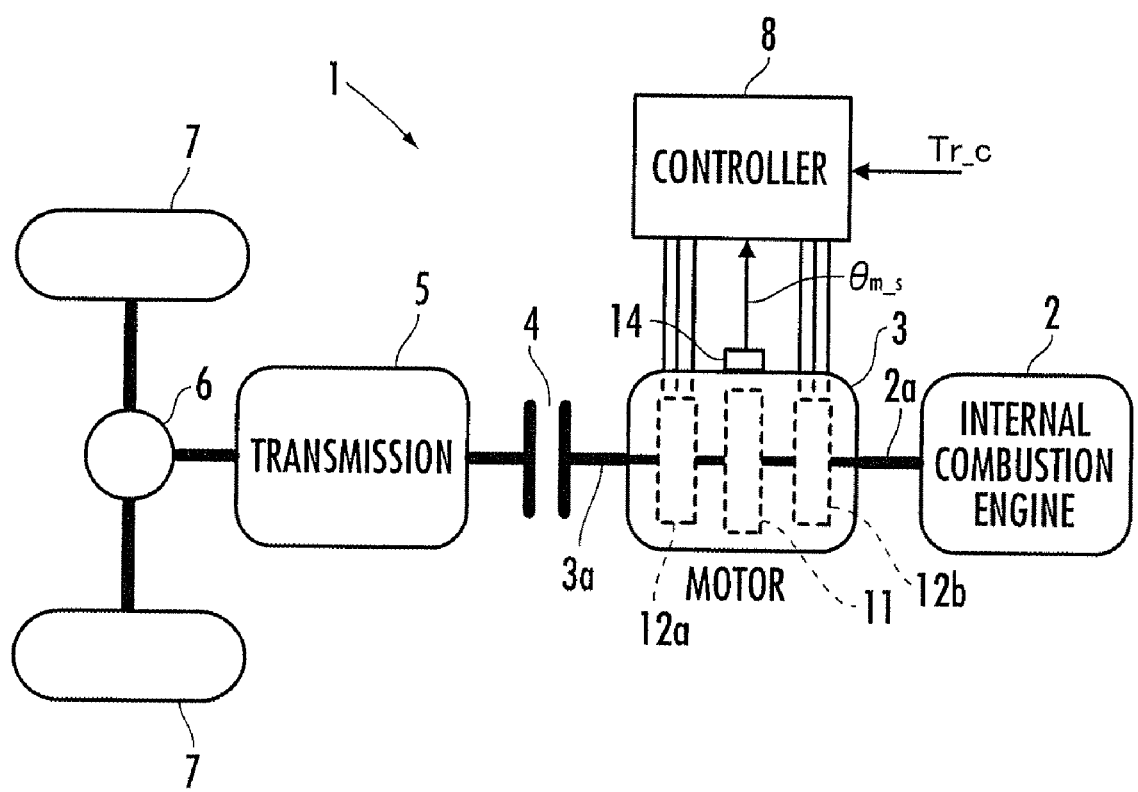
FIG. 1 is a constructional view of a vehicle to which a controller of an electric motor of the present invention is mounted.

First, the schematic construction of a vehicle mounting an electric motor of this embodiment will be explained with reference to FIG. 1. FIG. 1 is a view showing the schematic construction of this vehicle.

The vehicle 1 of this embodiment is a hybrid vehicle of a parallel type, and has an internal combustion engine (engine) 2 as a main propulsive force generating source of the vehicle 1, and also has an electric motor 3 as an auxiliary propulsive force generating source. The electric motor 3 is an electric motor of an axial air-gap type having a rotor 11, a first stator 12a and a second stator 12b although the electric motor 3 will be described later. A resolver 14 as a rotation angle detecting means for detecting a rotation angle of the rotor 11 of the electric motor 3 is arranged in the electric motor 3.

An output shaft 2a of the internal combustion engine 2 is coaxially directly connected to a rotating shaft 3a rotatable integrally with the rotor 11 of the electric motor 3. The output shaft 2a of the internal combustion engine 2 and the rotating shaft 3a of the electric motor 3 may be also connected through a power transmitting mechanism such as a speed reducer or the like. These output shaft 2a and rotating shaft 3a are connected to the input side of a transmission 5 through a clutch 4. An output side of the transmission 5 is connected to drive wheels 7, 7 of the vehicle 1 through a differential gear unit 6.

In this vehicle 1, output torque of the internal combustion engine 2, or torque provided by adding output torque (power torque) of the electric motor 3 to this output torque is transmitted to the drive wheels 7, 7 as propulsive force of the vehicle 1 through the clutch 4, the transmission 5 and the differential gear unit 6. Thus, running of the vehicle 1 is performed. The electric motor 3 can also perform a regenerative operation in which the electric motor 3 generates electricity by kinetic energy of the vehicle 1 transmitted from the drive wheels 7, 7 side to the electric motor 3 and this electric power generation energy is charged to an unillustrated storage battery as an electric source of the electric motor 3. Regenerative torque generated by the electric motor 3 during a regenerative operation functions as braking force of the vehicle 1.

Further, the vehicle 1 has a controller 8 for controlling the operation of the electric motor 3. A detection value θm_s of the rotation angle of the rotor 11 is inputted from the above resolver 14 to this controller 8. A torque command value Tr_c as a request value of the output torque of the electric motor 3 is also inputted to the controller 8. The torque command value Tr_c is determined by an unillustrated vehicle operation controller performing centralized operation control of the vehicle 1 in accordance with a manipulation amount of an accelerator pedal of the vehicle 1, a manipulation amount of a brake pedal, a vehicle speed or the like.

The controller 8 controls conducting electric currents of armature windings of the first stator 12a and the second stator 12b so as to generate the output torque of torque command value Tr_c in the electric motor 3.

Figure 2A:
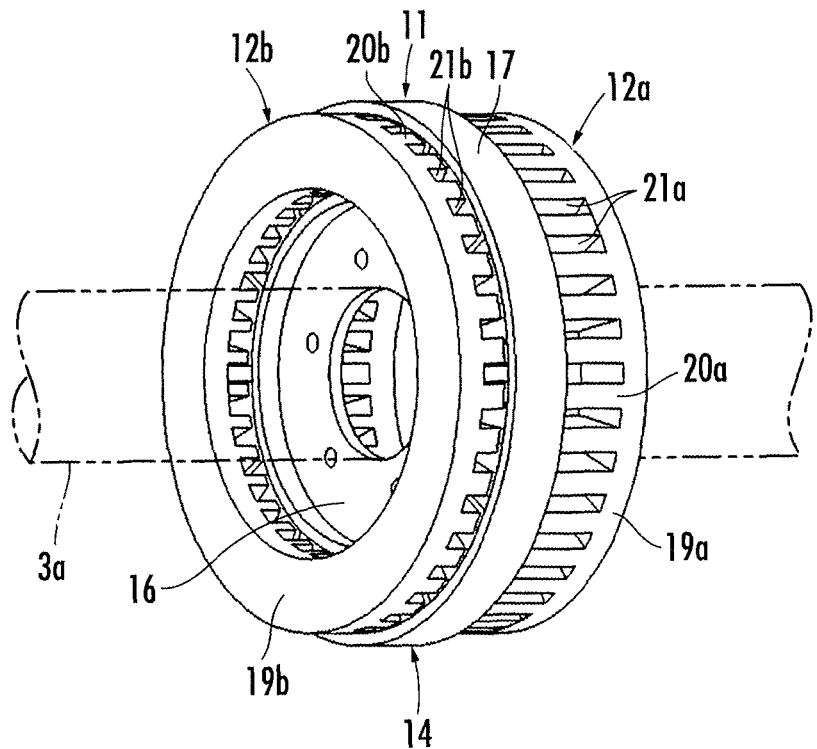
FIG. 2 is an explanatory view of the structure of the electric motor of an axial air-gap type.
Figure 2B:
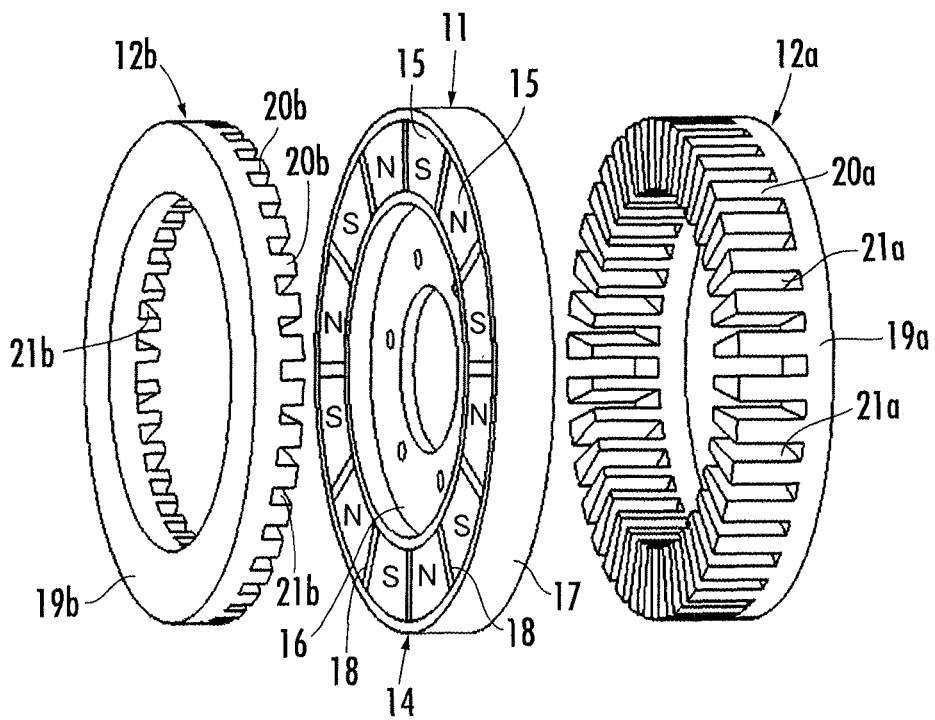

FIGS. 2(a) and 2(b) are perspective views showing the structure of the rotor 11 of the electric motor 3, the first stator 12a and the second stator 12b. FIG. 2(a) shows the rotor 11, the first stator 12a and the second stator 12b in an assembled state of the electric motor 3. FIG. 2(b) shows the rotor 11, the first stator 12a and the second stator 12b in a disassembled state of the electric motor 3.

The rotor 11 is constructed from a frame body 14 formed by a non-magnetic material, and a plurality of permanent magnets 15 assembled into this frame body 14. The frame body 14 is constructed by integrally forming a base body 16 of a disk shape, a circular ring-shaped body 17 spaced from an outer circumferential face of this base body 16 in a diametrical direction and coaxially arranged around the base body 16, and a plurality of partition plates 18 connecting these base body 16 and ring-shaped body 17. As shown by a virtual line in FIG. 2(a), the rotating shaft 3a is coaxially attached to the base body 16.

The plurality of partition plates 18 are radially extended between the outer circumferential face of the base body 16 and an inner circumferential face of the ring-shaped body 17, and are arrayed at an equal angle interval around the axis of the rotor 11. In each space surrounded by the outer circumferential face of the base body 16, the inner circumferential face of the ring-shaped body 17, and the partition plates 18, 18 adjacent to each other in the circumferential direction of the rotor 11, the permanent magnet 15 of the same shape as this space (fan plate shape) is fitted. Thus, the plurality of permanent magnets 15 are arrayed at an equal angle interval around the axis of the rotor 11 between the base body 16 and the ring-shaped body 17.

Each permanent magnet 15 is a magnet in which one face in its thickness direction (the axial direction of the rotor 11) is the north pole and the other face is the south pole. As described in each permanent magnet 15 of FIG. 2(b), the permanent magnets 15, 15 adjacent to each other in the circumferential direction of the rotor 11 are set such that their magnetic poles of faces of the same side in the thickness direction are different from each other. In other words, the plurality of permanent magnets 15 arranged in the rotor 11 are arrayed such that the orientations (orientations in the axial direction of the rotor 11) of magnetic fluxes of the permanent magnets 15, 15 adjacent in the circumferential direction of the rotor 11 are mutually reverse. In the illustrated example, the number of permanent magnets 15 is 12, and a number of pole-pairs of the rotor 11 is 6.

Additionally, the permanent magnets may be also arrayed respectively separately on one face side and the other face side of the axial direction of the rotor 11.

The first stator 12a and the second stator 12b have the same construction except that the first stator 12a and the second stator 12b are different in thickness. As shown in FIG. 2(b), a plurality of teeth 20a, 20b respectively projected in the axial direction of ring-shaped base bodies 19a, 19b from one face among both end faces in the axial direction of the base bodies 19a, 19b are arrayed at an equal angle interval around the axis of the base bodies 19a, 19b. The base bodies 19a, 19b and the teeth 20a, 20b are integrally formed by a magnetic material. In the illustrated example, the numbers of teeth 20a, 20b of the first stator 12a and the second stator 12b are respectively 36.

Figure 3:
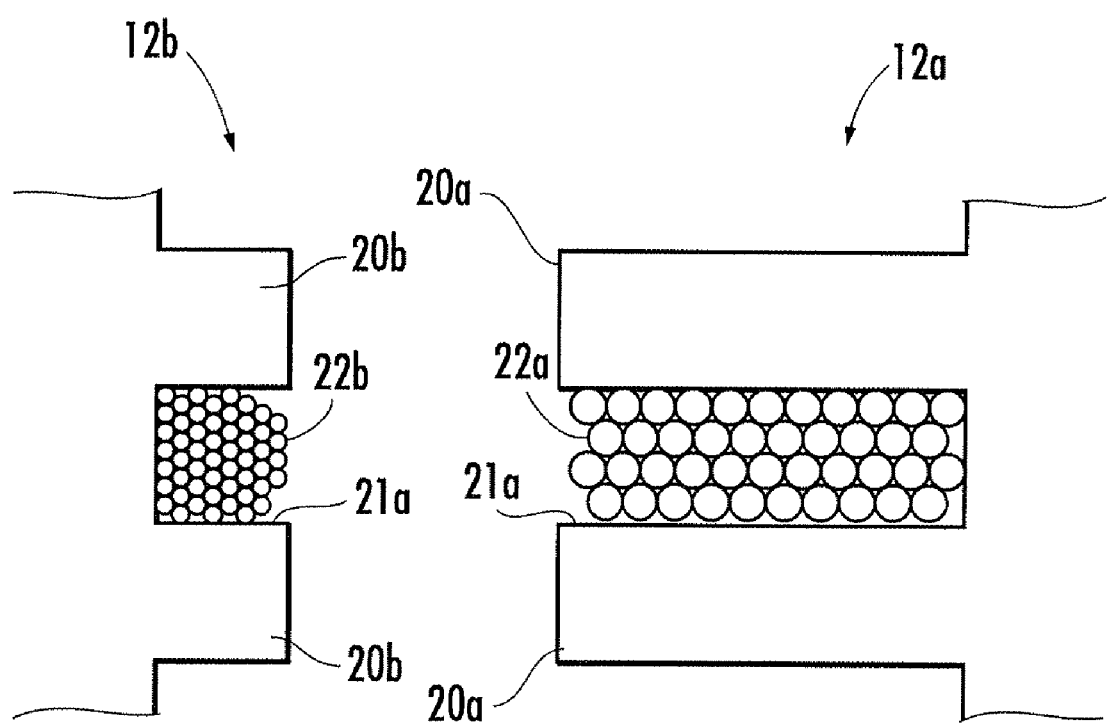
FIG. 3 is an explanatory view of a mounting mode of armature windings in a first stator and a second stator.

In the first stator 12a and the second stator 12b, as shown in FIGS. 2(b) and 3, an armature winding 22a is mounted to a slot 21a as a groove between the teeth 20a, 20a adjacent to each other in the circumferential direction, and an armature winding 22b is mounted to a slot 21b as a groove between the teeth 20b, 20b. FIG. 3 is a cross-sectional view of the first stator 12a and the second stator 12b.

In this embodiment, the armature winding 22a mounted to the first stator 12a and the armature winding 22b mounted to the second stator 12b have three phases (U-phase, V-phase and W-phase). Further, the armature winding 22a in the first stator 12a and the armature winding 22b in the second stator 12b are mutually mounted in the same manner.

For example, when the armature winding 22a of each phase of the first stator 12a is seen in the axial direction of the first stator 12a, this armature winding 22a is mounted to the first stator 12a such that a winding loop in number equal to the number of permanent magnets 15 of the rotor 11 is formed at an equal angle interval in the circumferential direction of the first stator 12a. The armature winding 22b of the second stator 12b side is also similarly mounted.

Further, a winding pattern of the armature winding 22a of the first stator 12a side and a winding pattern of the armature winding 22b of the second stator 12b side are the same, and a winding number of times of the armature winding 22b is set to be smaller than that of the armature winding 22a. Thus, when a predetermined driving voltage is applied to the armature winding 22a of the first stator 12a and the rotor 11 is rotated, a voltage generated in the armature winding 22b of the second stator 12b is set to be lower than the predetermined voltage.

Further, a wire diameter of the armature winding 22a of the first stator 12a is larger than that of the armature winding 22b of the second stator 12b so that the thickness of the second stator 12b is thinner than that of the first stator 12a.

As shown in FIG. 2(a), the first stator 12a and the second stator 12b are arranged coaxially with the rotor 11 on both sides of the axial direction of the rotor 11 in an assembled state of the electric motor 3 so as to sandwitch the rotor 11 between the first stator 12a and the second stator 12b, and are fixed to an unillustrated housing of the electric motor 3. In this case, tip faces of the tooth 20a of the first stator 12a and the tooth 20b of the second stator 12b are opposed in proximity to the rotor 11.

Further, in this embodiment, the first stator 12a and the second stator 12b are assembled into the electric motor 3 such that the position (an angular position around the axis) of each tooth 20a of the first stator 12a and the position (an angular position around the axis) of each tooth 20b of the second stator 12b are conformed when the electric motor 3 is seen in the axial direction of the rotor 11 in the assembled state of the electric motor 3.

Namely, the individual tooth 20a of the first stator 12a and the individual tooth 20b of the second stator 12b are arranged in direct opposing positions and are assembled in the axial direction of the rotor 11. The armature winding 22a of each phase of the first stator 12a and the armature winding 22b of the second stator 12b of the same phase as this armature winding 22a are mounted to the first stator 12a and the second stator 12b such that the winding loop of the armature winding 22a of the first stator 12a and the winding loop of the armature winding 22b of the second stator 12b are opposed to each other in the axial direction of the rotor 11 for each phase (such that the winding loop of the first stator 12a side and the winding loop of the second stator 12b side are mutually located in the same angular position when these armature windings are seen in the axial direction of the rotor 11).

Accordingly, when the electric current of the same phase is conducted to the armature winding 22a of each phase of the first stator 12a and the armature winding 22b of the second stator 12b of the same phase as this armature winding 22a, a magnetic flux generated by the armature winding 22a of the first stator 12a and a magnetic flux generated by the armature winding 22b of the second stator 12b attain a state mutually strengthened to its maximum extent in the axial direction of the rotor 11 for each phase. In this embodiment, the first stator 12a and the second stator 12b have the same structure except that the first stator 12a and the second stator 12b are different in thickness. Accordingly, magnetic circuit cross sections (cross sections of magnetic paths) for each phase of the first stator 12a and the second stator 12b are mutually the same.

Figure 4:
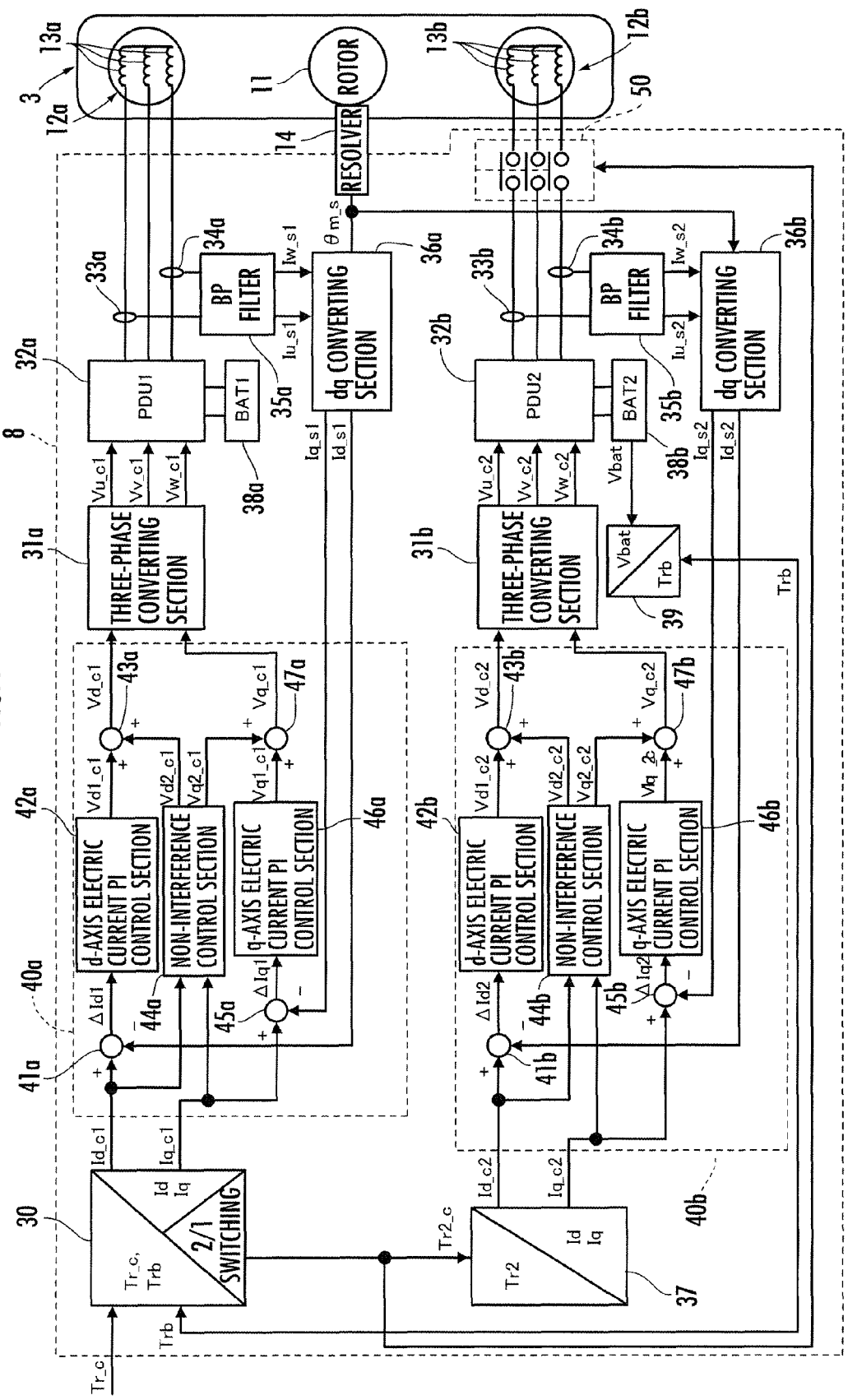
FIG. 4 is a block diagram showing a functional construction of the controller of the electric motor.

Next, the construction of the controller 8 will be explained in detail with reference to FIG. 4. FIG. 4 is a block diagram showing the functional construction of the controller 8. The controller 8 is constructed by an electronic circuit unit including a microcomputer and the like. In the following explanation, as shown in FIG. 4, reference numeral 13a is given to the armature winding of each phase mounted to the first stator 12a, and reference numeral 13b is given to the armature winding of each phase mounted to the second stator 12b.

First, the summary of control processing of the electric motor 3 using the controller 8 will be explained. In this embodiment, conducting electric currents (phase electric currents) of the armature windings 13a, 13b of each phase of the first stator 12a and the second stator 12b of the electric motor 3 are controlled by so-called d-q vector control. Namely, the controller 8 converts the armature windings 13a, 13a, 13a of the three phases of the first stator 12a, and the armature windings 13b, 13b, 13b of the three phases of the second stator 12b into equivalent circuits in a d-q coordinate system of a two-phase direct current, and treats these armature windings.

The equivalent circuits corresponding to the first stator 12a and the second stator 12b respectively have an armature on a d-axis (hereinafter called a d-axis armature), and an armature on a q-axis (hereinafter called a q-axis armature). The d-q coordinate system is a rotating coordinate system in which a field magnet direction provided by the permanent magnet 15 of the rotor 11 is the d-axis, and a direction perpendicular to the d-axis is the q-axis and this rotating coordinate system is rotated integrally with the rotor 11 of the electric motor 3.

The controller 8 then controls the electric currents of the respective phases of the armature winding 13a of the first stator 12a and the armature winding 13b of the second stator 12b of the electric motor 3 such that the torque of torque command value Tr_c given from the exterior is outputted from the rotating shaft 3a of the electric motor 3.

In this case, in this embodiment, control for switching between a "both-side stator driving mode" and a "one-side stator driving mode" are switched in accordance with the magnitude of torque command value Tr_c. In the "both-side stator driving mode", a driving electric current is conducted to both the armature winding 13a of the first stator 12a and the armature winding 13b of the second stator 12b, and the electric motor 3 is driven. In the "one-side stator driving mode", the driving electric current is conducted to only the armature winding 13a of the first stator 12a (the supply of the driving electric current to the armature winding 13b of the second stator 12b is stopped), and the electric motor 3 is driven.

Further, in the "one-side stator driving mode", the controller 8 performs control for switching between an "electricity generating mode" for charging a battery by electric power generated in the armature winding 13b of the second stator 12b by rotating the rotor 11, and an "interruption mode" for interrupting connection between the armature winding 13b of the second stator 12b and its driving circuit.

The controller 8 has a first electric current command determining section 30 as its functional construction. The first electric current command determining section 30 determines a d-axis electric current command value Id_c1 as a command value of the electric current (hereinafter called a d-axis electric current) of the d-axis armature of the first stator 12a, and a q-axis electric current command value Iq_c1 as a command value of the electric current (hereinafter called a q-axis electric current) of the q-axis armature. The first electric current command determining section 30 also switches between the "both-side stator driving mode" and the "one-side stator driving mode", and switches between the "electricity generating mode" and the "interruption mode" in the "one-side stator driving mode".

Further, the controller 8 has a first electric current control section 40a for determining a d-axis voltage command value Vd_c1 as a command value of the voltage (hereinafter called a d-axis voltage) of the d-axis armature of the first stator 12a, and a q-axis voltage command value Vq_c1 as a command value of the voltage (hereinafter called a q-axis voltage) of the q-axis armature, in accordance with d-axis electric current command value Id_c1 and q-axis electric current command value Iq_c1 of the first stator 12a.

Further, the controller 8 has electric current sensors 33a, 34a as an electric current detecting means for detecting the respective phase electric currents of the armature windings 13a, 13a of two phases, e.g., the U-phase and the W-phase, of the armature windings 13a, 13a, 13a of the three phases of the first stator 12a. The controller 8 also has a dq converting section 36a for calculating a d-axis electric current detection value Id_s1 as a detection value (estimated value) of the d-axis electric current of the first stator 12a and a q-axis electric current detection value Iq_s1 as a detection value (estimated value) of the q-axis electric current from an electric current detection value Iu_s1 of the U-phase armature winding 13a of the first stator 12a and an electric current detection value Iw_s1 of the W-phase armature winding 13a obtained by passing the outputs of these electric current sensors 33a, 34a through a BP (Band Pass) filter 35a. The BP filter 35a is a filter of bandpass characteristics for removing a noise component from the outputs of the electric current sensors 33a, 34a.

The dq converting section 36a calculates the d-axis electric current detection value Id_s1 and the q-axis electric current detection value Iq_s1 by coordinate-transforming the electric current detection value Iu_s1 of the U-phase armature winding 13a of the first stator 12a, the electric current detection value Iw_s1 of the W-phase armature winding 13a, and an electric current detection value Iv_s1 (=−Iu_s1−Iw_s1) of the V-phase armature winding 13a calculated from these electric current detection value Iu_s1 and electric current detection value Iw_s1 by the following expression (1) in accordance with an electric angle θe of the rotor 11 (calculated by multiplying a detection value θm_s of the rotation angle of the rotor 11 using the resolver 14 by the number of pole-pairs of the rotor 11).

[Numerical expression 1]

$$\begin{bmatrix} \text{Id\_s1} \\ \text{Iq\_s1} \end{bmatrix} = \sqrt{\frac{2}{3}} \cdot A(\theta e) \cdot \begin{bmatrix} \text{Iu\_s1} \\ \text{Iv\_s1} \\ \text{Iw\_s1} \end{bmatrix} \quad (1)$$

Here, $$A(\theta e) = \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix}$$

The first electric current control section 40*a* has a subtracting section 41*a* for calculating an error ΔId1 (=Id_c1−Id_s1) between the d-axis electric current command value Id_c1 and the d-axis electric current detection value Id_s1. The first electric current control section 40*a* also has a d-axis electric current PI control section 42*a* for calculating a basic command value Vd1_c1 of the d-axis voltage by feedback control using a PI (proportion-integration) control law so as to dissolve the error ΔId1 (bring the error ΔId1 close to zero). The first electric current control section 40*a* also has a subtracting section 45*a* for calculating an error ΔIq1 (=Iq_c1−Iq_s1) between the q-axis electric current command value Iq_c1 and the q-axis electric current detection value Iq_s1. The first electric current control section 40*a* also has a q-axis electric current PI control section 46*a* for calculating a basic command value Vq1_c1 of the q-axis voltage by the feedback control using the PI (proportion-integration) control law so as to dissolve the error ΔIq1 (bring the error ΔIq1 close to zero). The first electric current control section 40*a* further has a non-interference control section 44*a* for calculating a correction amount Vd2_c1 of the d-axis voltage and a correction amount Vq2_c1 of the q-axis voltage for canceling speed electromotive forces interfering with each other between the d-axis and the q-axis.

The non-interference control section 44*a* calculates the correction amount Vd2_c1 of the d-axis side from the q-axis electric current command value Iq_c1 and a rotor angular velocity (calculated by differentiating the detection value θm_s of the rotor angle), and calculates the correction amount Vq2_c1 of the q-axis side from the d-axis electric current command value Id_c1 and the rotor angular velocity.

Further, the first electric current control section 40*a* has an adding section 43*a* for adding the correction amount Vd2_c1 to the basic command value Vd1_c1 of the d-axis voltage and calculating the final d-axis voltage command value Vd_c1, and an adding section 47*a* for adding the correction amount Vq2_c1 to the basic command value Vq1_c1 of the q-axis voltage and calculating the final q-axis voltage command value Vq_c1.

Further, the controller 8 has a three-phase converting section 31*a* for calculating phase voltage command values Vu_c1, Vv_c1, Vw_c1 of the armature winding 13*a* of the respective U-phase, V-phase and W-phase of the first stator 12*a* from the d-axis voltage command value Vd_c1 and the q-axis voltage command value Vq_c1. The controller 8 also has a first PDU (Power Drive Unit) 32*a* for conducting an electric current to the armature winding 13*a* of each phase of the first stator 12*a* in accordance with these phase voltage command values Vu_c1, Vv_c1, Vw_c1. The controller 8 further has a battery 38*a* (corresponding to a first power source of the present invention) for supplying electric power to the first PDU 32*a*.

The three-phase converting section 31*a* calculates the above phase voltage command values Vu_c1, Vv_c1, Vw_c1 by coordinate-transforming the d-axis voltage command value Vd_c1 and the q-axis voltage command value Vq_c1 by the following expression (2) in accordance with the electric angle θe of the rotor 11. $A(\theta e)^T$ within expression (2) is a transposition matrix of matrix A(θe) defined in the provision of the above expression (1).

[Numerical expression 2]

$$\begin{bmatrix} \text{Vu\_c1} \\ \text{Vv\_c1} \\ \text{Vw\_c1} \end{bmatrix} = \sqrt{\frac{2}{3}} \cdot A(\theta e)^T \cdot \begin{bmatrix} \text{Vd\_c1} \\ \text{Vq\_c1} \end{bmatrix} \quad (2)$$

A first current conducting control means of the present invention is constructed by the first electric current command determining section 30, the first electric current control section 40*a*, the three-phase converting section 31*a*, the first PDU 32*a*, the battery 38*a*, the electric current sensors 33*a*, 34*a*, the bandpass filter 35*a*, and the dq converting section 36*a*.

Further, the controller 8 has a second electric current control section 40*b* for determining a d-axis voltage command value Vd_c2 and a q-axis voltage command value Vq_c2 of the second stator 12*b* in accordance with a d-axis electric current command value Id_c2 and a q-axis electric current command value Iq_c2 of the armature winding 13*b* of the second stator 12*b*. The controller 8 also has electric current sensors 33*b*, 34*b* for detecting the respective phase electric currents of the armature windings 13*a*, 13*a* of the U-phase and the W-phase among the armature windings 13*b*, 13*b*, 13*b* of the three phases of the second stator 12*b*. The controller 8 further has a dq converting section 36*b* for calculating a d-axis electric current detection value Id_s2 and a q-axis electric current detection value Iq_s2 of the second stator 12*b* from an electric current detection value Iu_s2 of the U-phase armature winding 13*b* and an electric current detection value Iw_s2 of the W-phase armature winding 13*b* of the second stator 12*b* obtained by passing the outputs of these electric current sensors 33*b*, 34*b* through the BP filter 35*a*.

Similar to the above-mentioned first electric current control section 40*a*, the second electric current control section 40*b* has a subtracting section 41*b* for calculating an error ΔId2 (=Id_c2−Id_s2) between the d-axis electric current command value Id_c2 and the d-axis electric current detection value Id_s2. The second electric current control section 40*b* also has a d-axis electric current PI control section 42*b* for calculating a basic command value Vd1_c2 of the d-axis voltage by feedback control using a PI (proportion-integration) control law so as to dissolve the error ΔId2 (bring the error ΔId2 close to zero). The second electric current control section 40*b* also has a subtracting section 45*b* for calculating an error ΔIq2 (=Iq_c2−Iq_s2) between the q-axis electric current command value Iq_c2 and the q-axis electric current detection value Iq_s2. The second electric current control section 40*b* also has a q-axis electric current PI control section 46*b* for calculating a basic command value Vq1_c2 of the q-axis voltage by the feedback control using the PI (proportion-integration) control law so as to dissolve the error ΔIq2 (bring the error ΔIq2 close to zero). The second electric current control section 40*b* further has a non-interference control section 44*b* for calculating a correction amount Vd2_c2 of the d-axis voltage and a correction amount Vq2_c2 of the q-axis voltage for canceling speed electromotive forces interfering with each other between the d-axis and the q-axis.

Further, the second electric current control section 40b has an adding section 43b for adding the correction amount Vd2_c2 to the basic command value Vd1_c2 of the d-axis voltage and calculating the final d-axis voltage command value Vd_c2, and an adding section 47b for adding the correction amount Vq2_c2 to the basic command value Vq1_c2 of the q-axis voltage and calculating the final q-axis voltage command value Vq_c2.

Further, the controller 8 has a three-phase converting section 31b for calculating phase voltage command values Vu_c2, Vv_c2, Vw_c2 of the armature winding 13b of the respective U-phase, V-phase and W-phase of the second stator 12b from the d-axis voltage command value Vd_c2 and the q-axis voltage command value Vq_c2. The controller 8 also has a second PDU 32b for conducting an electric current to the armature winding 13b of each phase of the second stator 12b in accordance with these phase voltage command values Vu_c2, Vv_c2, Vw_c2. The controller 8 also has a battery 38b (corresponding to a second power source of the present invention) for supplying electric power to the second PDU 32b and charged by output electric power of the second PDU 32b. The controller 8 further has a charging state detecting section 39 (corresponding to a charging state detecting means of the present invention) for outputting an electricity generating torque command value Trb according to output voltage Vbat of the battery 38b (corresponding to a charging state of the present invention) to the first electric current command determining section 30.

The charging state detecting section 39 increases the electricity generating torque command value Trb as a charging amount of the battery 38b decreases. The charging state detecting section 39 sets the electricity generating torque command value Trb to zero when the battery 38b is in a full charging state.

The d-axis electric current command value Id_c2 and the q-axis electric current command value Iq_c2 of the second stator 12b are determined by a second electric current command determining section 37. The second electric current command determining section 37 determines d-axis electric current command value Id_c2 and q-axis electric current command value Iq_c2 by applying torque command value Tr2_c with respect to the second stator 12b determined by the first electric current command determining section 30 to a corresponding map (data of the corresponding map are stored to an unillustrated memory) of preset torque Tr_2 and the d-axis electric current Id and the q-axis electric current Iq.

In this case, when torque command value Tr2_c is positive, the "driving mode" for supplying the driving electric current to the armature winding 13b of the second stator 12b is attained. When torque command value Tr2_c is negative, the "electricity generating mode" for charging the battery 38b by electric power generated in the armature winding 13b of the second stator 12b by rotating the rotor 11 is attained.

Further, when torque command value Tr2_c is zero, the "interruption mode" for turning-off the switch of each phase of the change-over switch 50 (opening state) and interrupting connection between the second PDU 32b and the armature winding 13b of the second stator 12b is attained. In the "driving mode" and the "electricity generating mode", the switch of each phase of the change-over switch 50 is turned on and the second PDU 32b and the armature winding 13b of the second stator 12b are set to a current conducting state.

Further, the first electric current command determining section 30 applies torque command value Tr_c and electricity generating torque command value Trb to a corresponding map (data of the corresponding map are stored to an unillustrated memory) between torque command value Tr_c with respect to the electric motor 3 set in advance and electricity generating torque command value Trb according to a charging state of the battery 39b, and d-axis electric current Id, q-axis electric current Iq of the first stator 12a and torque command value Tr2_c with respect to the second stator 12b, and determines torque command value Tr2_c with respect to the second stator 12b, and d-axis electric current command value Id_c1 and q-axis electric current command value Iq_c1 of the first stator 12a.

Figure 6:
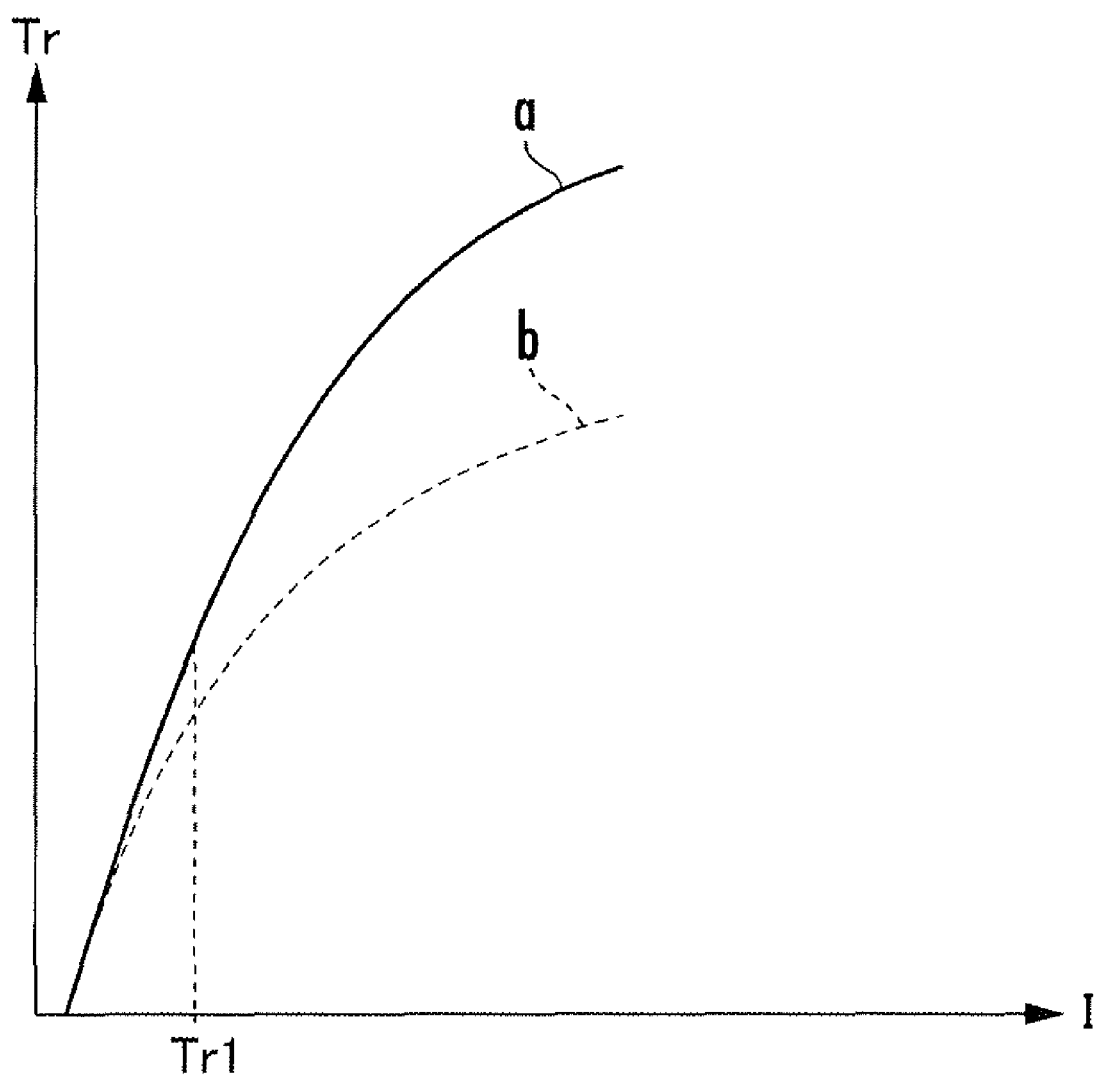
FIG. 6 is an explanatory view of operation states of a both-side stator driving mode and a one-side stator driving mode.

Here, FIG. 6 is a graph showing the relation of output torque Tr and conducting electric current I of the electric motor 3. In this figure, the axis of ordinate is set to output torque Tr, and the axis of abscissa is set to conducting electric current I. Reference numeral a in this figure shows the "both-side stator driving mode" for supplying a driving electric current to both the first stator 12a and the second stator 12b, and reference numeral b shows the "one-side stator driving mode" for conducting the driving electric current to only the first stator 12a.

As can be seen from FIG. 6, an upper limit of the output torque of the electric motor 3 can be expanded by setting the "both-side stator driving mode" and changing the output characteristics of the electric motor 3 to a high torque specification. Further, in a low torque area of Tr<Tr1 within this figure, the difference in output torque between the "both-side stator driving mode" and the "one-side stator driving mode" with respect to the same conducting electric current is reduced.

Therefore, in the above corresponding map in the first electric current command determining section 30, the "one-side stator driving mode" is set when torque command value Tr_c is a preset threshold value Tr1 or less. When torque command value Tr_c exceeds the threshold value Tr1, the "both-side stator driving mode" is set. Thus, in the low torque area, the "one-side stator driving mode" is attained and the output characteristics of the electric motor 3 become a low torque specification. Therefore, it is possible to avoid electric power loss on the second stator 12b side and improve operation efficiency of the electric motor 3.

Here, in the "both-side stator driving mode", positive torque command value Tr2_c is outputted from the first electric current command determining section 30 to the second electric current command determining section 37. Thus, the driving electric current is supplied to both the armature winding 13a of the first stator 12a and the armature winding 13b of the second stator 12b, and the output torque of the electric motor 3 is increased.

Further, in the above corresponding map in the first electric current command determining section 30, when electricity generating torque command value Trb is outputted in the "one-side stator driving mode", d-axis electric current command value Id_c1 and q-axis electric current command value Iq_c1 of the first stator 12a are determined such that total torque of torque command value Tr_c and electricity generating torque command value Trb is generated by the supply of the driving electric current to the armature winding 13a of the first stator 12a.

Torque command value Tr2_c outputted to the second electric current command determining section 37 is then set to correspond to electricity generating torque command value Trb. Thus, the above "electricity generating mode" for charging the battery 38b through the second PDU 32b by electric power generated in the second stator 12b by rotating the rotor 11 is attained.

Here, as mentioned above, when a predetermined voltage is applied to the armature winding 13a of the first stator 12a and the rotor 11 is rotated, an induced voltage caused in the armature winding 13b of the second stator 12b becomes lower than the predetermined voltage. Therefore, a withstand voltage specification of the second PDU 32b can be set to be lower than that of the first PDU 32a. Thus, the second PDU 32b can be made compact and reduced in cost.

Further, the output of the battery 38b of the second stator 12b side becomes lower than that of the battery 38a of the first stator 12a side. Namely, the electric motor 3 can be set to function as an alternator, and the battery 38b can be used as an electric power source for a device of a low voltage specification.

Further, when electricity generating torque command value Trb is zero, torque command value Tr2_c outputted from the first electric current command determining section 30 to the second electric current command determining section 37 also becomes zero. Thus, the switch of each phase of the change-over switch 50 is turned off, and the above "interruption mode" is attained. In this case, the above "one-side stator driving mode" for supplying the driving electric current to only the armature winding 13a of the first stator 12a is attained, and no induced voltage is caused in the armature winding 13b of the second stator 12b when the rotor 11 is rotated. Therefore, rotation load of the rotor 11 is reduced.

Figure 5:
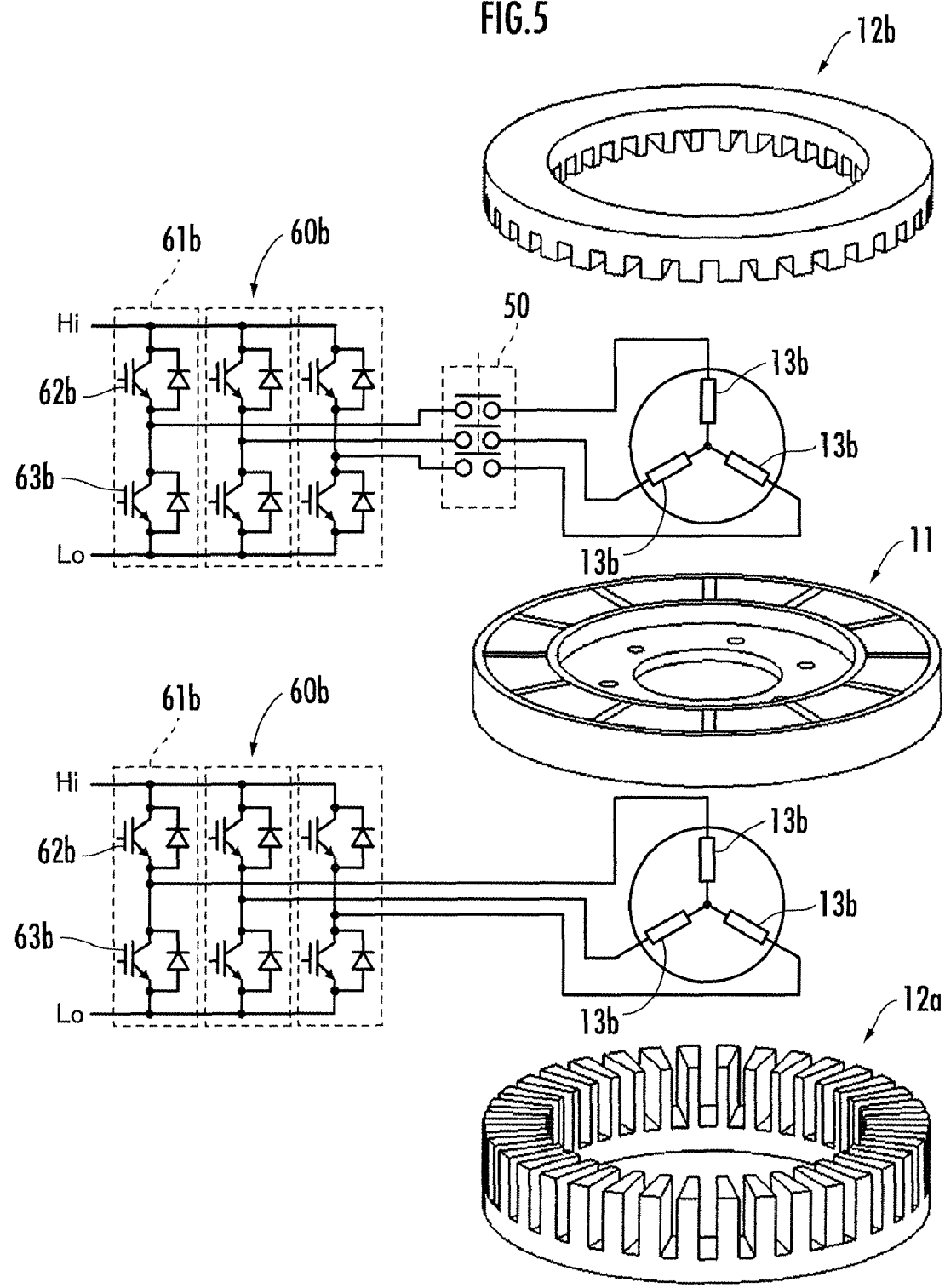
FIG. 5 is a constructional view of a driving circuit of the electric motor.

Next, FIG. 5 is a view showing the construction of an inverter 60a arranged in the first PDU 32a, and an inverter 60b arranged in the second PDU 32b. The first PDU 32a has the inverter 60a in which a switching circuit 61a is arranged for armature winding 13a of each phase. The switching circuit 61a has a transistor 62a for conducting/interrupting an input section of the armature winding 13a of each phase of the first stator 12a on a high electric potential side (a side shown by Hi within this figure), and a transistor 63a for conducting/interrupting this input section on a low electric potential side (Lo within this figure). The first PDU 32a changes an electric current conducting amount of each armature winding 13a by switching on/off of the transistor 62a and the transistor 63a of each switching circuit 61a by PWM control.

Similarly, the second PDU 32b has an inverter 60b having a switching circuit 61b for armature winding 13b of each phase. The switching circuit 61b has a transistor 62b (corresponding to a first switching element of the present invention) for conducting/interrupting each armature winding 13b of the second stator 12b on a high electric potential side, and a transistor 63b (corresponding to a second switching element of the present invention) for conducting/interrupting each armature winding 13b of the second stator 12b on a low electric potential side.

In this embodiment, in the "interruption mode", the switch of each phase of the change-over switch 50 is turned off and the portion between the second PDU 32b and the armature winding 13b of each phase of the second stator 12b is interrupted. However, all transistors 62b, 63b of the inverter 60b shown in FIG. 6 may be also turned off (gate off) without arranging the change-over switch 50. Further, when the rotational speed of the electric motor 3 exceeds a predetermined rotational speed, all transistors 62b of the high electric potential side of the inverter 60b shown in FIG. 6 are turned on and all transistors 63b of the low electric potential side are turned off, or all the transistors 63b of the low electric potential side of the inverter 60b are turned on and all the transistors 62b of the low electric potential side are turned off, so that a so-called three-phase short-circuit state is set. Thus, the current conducting amount of each armature winding 13b of the second stator 12b is further reduced and electric power loss can be reduced.

The rotational speed of the electric motor 3 can be detected by differentiating detection value θm_s of the rotation angle of the rotor 11 by the resolver 14. The construction for detecting the rotational speed of the electric motor 3 in this way corresponds to a rotational speed detecting means of the present invention.

In this embodiment, in the "electricity generating mode", the characteristics of the armature winding 13a and the armature winding 13b are set such that the induced voltage caused in the armature winding 13b of the second stator 12b becomes lower than a voltage applied to the armature winding 13a of the first stator 12a. However, the effects of the present invention can be also obtained even when such characteristics are not set.

Further, in this embodiment, the "driving mode" and the "electricity generating mode" are switched in accordance with torque command value Tr_c with respect to the electric motor 3 and the charging state of the battery 38b of the second stator 12b side. However, the "driving mode" and the "electricity generating mode" may be also switched in accordance with only torque command value Tr_c with respect to the electric motor 3.

Further, in this embodiment, when torque command value Tr2_c with respect to the second stator 12b is zero, the "interruption mode" for interrupting the portion between the second PDU 32b and the armature winding 13b of the second stator 12b is set. However, the effects of the present invention can be also obtained even when no "interruption mode" is set.

What is claimed is:

1. A controller of an electric motor of an axial air-gap type comprising a rotor having a permanent magnet, and a first stator and a second stator oppositely arranged through the rotor in a rotation axis direction of the rotor;

wherein the controller comprises a first current conducting control means for supplying a driving electric current from a first power source to an armature winding of the first stator in order to rotate the rotor; and a second current conducting control means for charging a second power source by electric power generated in an armature winding of the second stator when the rotor is rotated by the supply of the driving electric current to the armature winding of the first stator, and wherein characteristics of the armature winding of the first stator and the armature winding of the second stator are set such that an induced voltage caused in the armature winding of the second stator by rotating the rotor becomes lower than a predetermined voltage when the predetermined voltage is applied to the armature winding of the first stator by the first current conducting control means and the driving electric current is supplied thereto, the controller further comprising:

a charging state detecting means for detecting a charging state of the second power source; and a change-over switch for switching connection between the armature winding of the second stator and a driving circuit of the armature winding of the second stator to a conducting state and an interrupting state; and the second current conducting control means switches between an electricity generating mode for charging the second power source by electric power generated in the armature winding of the second stator, a driving mode for supplying the driving electric current from the second power source to the armature winding of the second stator, and an interruption mode for setting a portion between the armature winding of the second stator and a driving circuit of the armature winding of the second stator to the interrupting state by the change-over switch, in accordance with request torque of the electric motor and the charging state of the second power source.

2. A controller of an electric motor of an axial air-gap type comprising a rotor having a permanent magnet, and a first stator and a second stator oppositely arranged through the rotor in a rotation axis direction of the rotor;

wherein the controller comprises a first current conducting control means for supplying a driving electric current from a first power source to an armature winding of the first stator in order to rotate the rotor; and a second current conducting control means for charging a second power source by electric power generated in an armature winding of the second stator when the rotor is rotated by the supply of the driving electric current to the armature winding of the first stator, and wherein characteristics of the armature winding of the first stator and the armature winding of the second stator are set such that an induced voltage caused in the armature winding of the second stator by rotating the rotor becomes lower than a predetermined voltage when the predetermined voltage is applied to the armature winding of the first stator by the first current conducting control means and the driving electric current is supplied thereto, the controller further comprising:

a charging state detecting means for detecting a charging state of the second power source; and in accordance with request torque of the electric motor and the charging state of the second power source, the second current conducting control means switches between an electricity generating mode for charging the second power source by electric power generated in the armature winding of the second stator, a driving mode for supplying the driving electric current from the second power source to the armature winding of the second stator, and an interruption mode in which both a first switching element for switching conduction and interruption on a high electric potential side of an input section of the armature winding of each phase, and a second switching element for switching conduction and interruption on a low electric potential side of the input section of the armature winding of each phase are set to an off state, wherein the first switching element and the second switching element constitute a driving circuit of the second stator and are arranged for each phase of the second stator.

3. The controller of the electric motor according to claim 1, wherein the second current conducting control means switches between an electricity generating mode for charging the second power source by electric power generated in the armature winding of the second stator, and a driving mode for supplying the driving electric current from the second power source to the armature winding of the second stator in accordance with request torque of the electric motor.

4. The controller of the electric motor according to claim 3, wherein the controller further comprises a charging state detecting means for detecting a charging state of the second power source, and the second current conducting control means switches between the electricity generating mode and the driving mode, in accordance with the request torque of the electric motor and the charging state of the second power source.

5. The controller of the electric motor according to claim 2, wherein the controller further comprises a rotational speed detecting means for detecting a rotational speed of the electric motor; and in the interruption mode, the second current conducting control means sets each first switching element and each second switching element to the off state when the rotational speed of the electric motor is less than a predetermined rotational speed, and sets each first switching element to an on state and sets each second switching element to the off state, or sets each first switching element to the off state and sets each second switching element to the on state, when the rotational speed of the electric motor is the predetermined rotational speed or more.

6. The controller of the electric motor according to claim 2, wherein the second current conducting control means switches between electricity generating in the armature of the second stator and a driving mode supplying driving electric current from the second power source to the armature winding of the second stator, in accordance with the request torque of the electric motor.

7. The controller of the electric motor according to claim 6, wherein the controller further comprises a charging state detecting means for detecting a charging state of the second power source, and the second current conducting control means switches between the electricity generating mode and the driving mode in accordance with the request torque of the electric motor and the charging state of the second power source.

8. A controller of an electric motor of an axial air-gap type comprising a rotor having a permanent magnet, and a first stator and a second stator oppositely arranged through the rotor in a rotation axis direction of the rotor;

wherein the controller comprises a first current conducting control means for supplying a driving electric current from a first power source to an armature winding of the first stator in order to rotate the rotor; and a second current conducting control means for charging a second power source by electric power generated in an armature winding of the second stator when the rotor is rotated by the supply of the driving electric current to the armature winding of the first stator, wherein the controller further comprises:

a charging state detecting means for detecting a charging state of the second power source; and a change-over switch for switching connection between the armature winding of the second stator and a driving circuit of the armature winding of the second stator to a conducting state and an interrupting state; and the second current conducting control means switches between an electricity generating mode for charging the second power source by electric power generated in the armature winding of the second stator, a driving mode for supplying the driving electric current from the second power source to the armature winding of the second stator, and an interruption mode for setting a portion between the armature winding of the second stator and a driving circuit of the armature winding of the second stator to the interrupting state by the change-over switch in accordance with request torque of the electric motor and the charging state of the second power source.

9. A controller of an electric motor of an axial air-gap type comprising a rotor having a permanent magnet, and a first stator and a second stator oppositely arranged through the rotor in a rotation axis direction of the rotor;

wherein the controller comprises a first current conducting control means for supplying a driving electric current from a first power source to an armature winding of the first stator in order to rotate the rotor; and a second current conducting control means for charging a second power source by electric power generated in an armature winding of the second stator when the rotor is rotated by the supply of the driving electric current to the armature winding of the first stator, wherein the controller further comprises a charging state detecting means for detecting a charging state of the second power source; and in accordance with request torque of the electric motor and the charging state of the second power source, the second current conducting control means switches between an electricity generating mode for charging the second power source by electric power generated in the armature winding of the second stator, a driving mode for supplying the driving electric current from the second power source to the armature winding of the second stator, and an interruption mode in which both a first switching element for switching conduction and interruption on a high electric potential side of an input section of the armature winding of each phase, and a second switching element for switching conduction and interruption on a low electric potential side of the input section of the armature winding of each phase are set to an off state, wherein the first switching element and the second switching element constitute a driving circuit of the second stator and are arranged for each phase of the second stator.

10. The controller of the electric motor according to claim 9, wherein the controller further comprises a rotational speed detecting means for detecting a rotational speed of the electric motor; and in the interruption mode, the second current conducting control means sets each first switching element and each second switching element to the off state when the rotational speed of the electric motor is less than a predetermined rotational speed, and sets each first switching element to an on state and sets each second switching element to the off state, or sets each first switching element to the off state and sets each second switching element to the on state, when the rotational speed of the electric motor is the predetermined rotational speed or more.

11. A controller of an electric motor of an axial air-gap type comprising a rotor having a permanent magnet, and a first stator and a second stator oppositely arranged through the rotor in a rotation axis direction of the rotor;

wherein the controller comprises a first current conducting control means for supplying a driving electric current from a first power source to an armature winding of the first stator in order to rotate the rotor; and a second current conducting control means for charging a second power source by electric power generated in an armature winding of the second stator when the rotor is rotated by the supply of the driving electric current to the armature winding of the first stator, wherein magnetic circuit cross sections of the first stator and the second stator are set to the same.

* * * * *